United States Patent [19]

Carson

[11] 4,443,419

[45] Apr. 17, 1984

[54] MOVING BED GAS TREATING PROCESS

[75] Inventor: Don B. Carson, Mt. Prospect, Ill.

[73] Assignee: UOP Inc., Des Plaines, Ill.

[21] Appl. No.: 429,699

[22] Filed: Sep. 9, 1982

[51] Int. Cl.$^3$ .................... B01J 8/00; C01B 17/00

[52] U.S. Cl. ............................... 423/244; 423/239; 422/62; 422/110; 55/73; 55/74; 55/77

[58] Field of Search .......... 423/244 R, 244 A, 242 A, 423/242 R, 239, 239 A; 55/73, 74, 77; 422/62, 110

[56] References Cited

U.S. PATENT DOCUMENTS

| | | | |
|---|---|---|---|
| 1,731,223 | 10/1929 | Brady | 423/244 |
| 2,992,895 | 7/1961 | Feustel et al. | 423/239 |
| 3,799,866 | 3/1974 | Lengemann | 208/139 |
| 3,966,879 | 6/1976 | Groenendaal et al. | 423/244 |
| 4,126,435 | 11/1978 | Reese | 55/474 |
| 4,254,616 | 3/1981 | Siminski et al. | 60/39.12 |
| 4,258,020 | 3/1981 | Ginger | 423/239 |

*Primary Examiner*—Gregory A. Heller
*Attorney, Agent, or Firm*—James R. Hoatson, Jr.; John F. Spears, Jr.; William H. Page, II

[57] ABSTRACT

A gas treating process for simultaneous solid particle filtering and sulfur oxide removal is described. The feed gas stream is passed horizontally through a first moving bed of treating particles, which trap fine particles entrained in the gas stream. The treating particles of the bed also are effective in removing sulfur oxides by reaction with the sulfur oxides. The effluent of the first moving bed is passed through an upper second moving bed of fresh treating particles. Preferably the concentration of sulfur dioxide in the effluent of the first bed is monitored to control either, and possibly both, the rate at which gas bypasses the second bed or the rate at which the treating particles are transferred from the second to the first beds.

5 Claims, 1 Drawing Figure

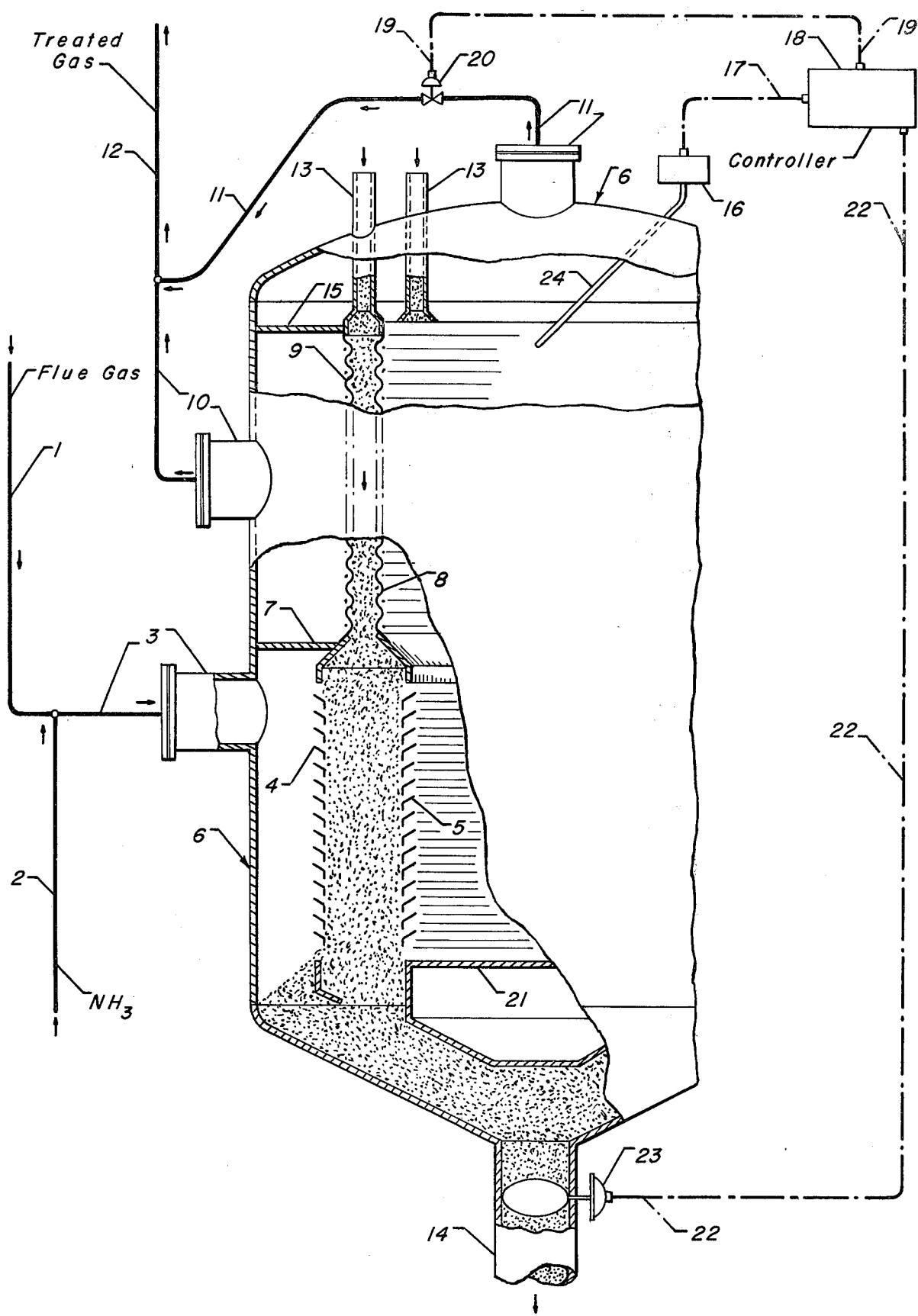

MOVING BED GAS TREATING PROCESS

FIELD OF THE INVENTION

The invention relates to a process for treating or purifying a feed gas stream by the removal of entrained solid particles (dust) from the feed gas stream. The invention is more directly concerned with the simultaneous removal of these entrained particles and various chemical compounds, such as sulfur dioxide, from a flue gas stream produced by the combustion of a hydrocarbonaceous fuel. The invention specifically relates to the treatment of a gas stream in cross-flow contactors wherein the gas stream flows horizontally through a slowly descending bed of treating particles confined between two porous partitions, with fine particles entrained in the gas stream being filtered out and collected within the moving bed of treating particles while gaseous pollutants in the gas stream are removed by reaction with the treating particles.

PRIOR ART

The use of moving bed filters to remove entrained particles from a gas stream passed horizontally through a particle bed retained between two porous partitions is well documented in available literature. For instance, the preferred apparatus for confining and handling the moving bed is described in U.S. Pat. No. 4,126,435 issued to R. G. Reese. This patent also describes the use of the apparatus and suitable materials for use as the moving bed particles.

U.S. Pat. No. 4,254,616 issued to V. Siminski et al is relevant for its teaching of the simultaneous removal of both entrained particles and pollutants, specifically nitrogen oxides and sulfur oxides, from a gas stream such as a combustion zone flue gas stream. This reference also describes solid absorbents suitable for use in removing the sulfur oxides such as copper-containing alumina particles.

U.S. Pat. No. 3,799,866 issued to R. A. Lengemann illustrates the use of a moving bed reactor in a hydrocarbon conversion process. In the particular process of this reference, the reactant stream makes several passes through different points of a downward flowing bed of catalyst. The complete deactivation, due to a zone front deactivation effect, of the catalyst in the lowermost pass is also described.

U.S. Pat. No. 3,966,879 issued to W. Groenendaal et al teaches the use of a cross-flow contactor using a moving bed of particles which have the ability to remove sulfur oxides from a flue gas stream. The process of this reference therefore simultaneously removes both entrained particles and sulfur oxides from the feed gas stream. The particles (acceptors) used in this process are preferably alumina or silica-alumina supports which have been impregnated with copper as well as aluminum and sodium. The particles are withdrawn from the contactor, separated from the collected fine particulate matter and then regenerated.

BRIEF SUMMARY OF THE INVENTION

The subject invention provides a process for simultaneously removing undesired chemical compounds and entrained fine particles from a gas stream through the use of a cross-current contactor. The subject process may be employed to ensure the complete utilization of the chemical capacity of the treating particles of the contactor to thereby minimize circulation rates, particle attrition and regeneration rates. A broad embodiment of the invention may be characterized as a process for treating gas streams which comprises the steps of passing a feed gas stream, which comprises entrained particles and a sulfur oxide, horizontally through a vertical first contacting bed comprising treating particles and therein removing entrained particles from the feed gas stream and also removing a sulfur oxide from the feed gas stream by the chemical reaction of the sulfur oxide with the treating particles, and thereby forming a first process stream which is substantially free of entrained particles but which contains residual sulfur oxide; passing the first process stream through a vertical second contacting bed comprising treating particles and removing additional sulfur oxide by the chemical reaction of the sulfur oxide with the treating particles and thereby producing a treated effluent stream; transferring treating particles downward through the second contacting bed by the action of gravity; and, transferring treating particles removed from the second contacting bed into the top of the first contacting bed and downward through the first contacting bed.

In more limited embodiments of the invention, the concentration of a sulfur oxide in the first process stream is monitored. This concentration is then used to control either the rate of diversion of the first process stream around the second contacting bed, thereby minimizing the pressure drop through the process, or to control the rate of treating particle transfer downward through the two contacting beds.

BRIEF DESCRIPTION OF THE DRAWING

The drawing is a simplified cross-sectional sketch of an apparatus which may be used in the performance of the subject process and associated external process lines and control elements. No attempt has been made on the drawing to show the many miscellaneous accouterments and engineering details of the apparatus such as manways, internal supports, flanges, fastening mechanisms and flow deflecting or direction control means employed within the apparatus. The depiction of these embodiments is not intended to preclude from the scope of the subject invention those other embodiments described herein or which are the result of the normal and expected modification of those embodiments.

A feed gas stream comprisinq a flue gas removed from a coal fired power plant is fed to the process through line 1 and is admixed with a stream of ammonia from line 2. This admixture is fed through line 3 to the external vessel 6 which encloses the apparatus employed in the practice of the process. The feed gas stream enters an annular form void volume and is distributed across the outer face of a cylindrical outer porous partition 4. The feed gas stream admixture then flows horizontally inward through the annular bed of treating particles retained between the outer screen 4 and a similar inner cylindrical porous partition 5. The treated gas emerges from the annular bed of treating particles between the partitions 4 and 5, which is referred to herein as the first contacting bed, and enters a cylindrical volume within the inner partition 5 and above an imperforate bottom plate 21. During the passage of the feed stream admixture through the first contacting bed, fine fly ash particles entrained in the flue gas stream are collected within the bed and thus separated from the feed gas stream. Simultaneously sulfur dioxide present in the flue gas stream reacts to form copper sulfate on the surface of the treating particles. The copper sulfate is an effective catalyst for the reduction of nitrogen oxides by the added ammonia. The passage of flue gas stream through the first contacting zone at the proper operating conditions is therefore effective in reducing both the concentration of entrained particulate matter and the atmospheric pollutants sulfur dioxide and nitrogen oxide.

The effluent of the first contacting bed rises through the cylindrical volume to the upper section of the apparatus and normally passes horizontally outward through a second contacting bed which is retained between an inner cylindrical screen 8 and an outer cylindrical screen 9. The effluent stream of the second contacting bed is confined to the annular space in the upper section of the apparatus between the upper seal plate 15 and the lower seal plate 7 and is thereby directed into the effluent lines 10 and 12. Treating particles are slowly withdrawn from the bottom of the apparatus through the outlet conduit 14 at a rate controlled by the valve 23. This removal of the treating particles, and the particulate matter which has been separated from the feed stream, causes the gradual downward movement of the treating particles forming the first contacting bed and the second contacting bed. The necessary inventory of treating particles is replenished by a number of small streams of treating particles which enter the apparatus through a particle addition manifold, represented by the two particle inlet lines 13, which passes through the upper end of the outer vessel and communicates with the top of the second contacting bed at a plurality of dispersed locations.

The concentration of sulfur oxide or other pollutants in the gas which is already passed through the first contacting bed is measured by the composition monitoring means 16 which receives a representative sample of this gas through the sample probe 24. A signal representative of the composition of the gas is transmitted to a controller 18 through the means 17. In response to this signal, the controller may adjust the rate of treating particle transfer through the first contacting bed by transmitting a signal through the means 22 to the particle flow control valve operator 23. The controller 18 may also generate a signal transmitted through means 19 to the flow control valve 20 located in the outlet conduit 11. Both control mechanisms may be employed simultaneously to minimize both the passage rate of the treating particles through the process and the pressure drop imposed upon the gas stream within the apparatus. The pressure drop is reduced by allowing all or a portion of the gas which has passed through the first contacting bed to flow through lines 11 and 12 thereby bypassing the upper second contacting bed.

DETAILED DESCRIPTION

There are many situations in which it is desired to remove both a vaporous chemical compound and a particulate material from a gas stream. Perhaps the most common situation is the discharge of effluent streams of industrial facilities. These effluent streams will often result from a combustion process and therefore contain solid particles derived from a carbonaceous fuel and various atmospheric pollutants including sulfur dioxide, sulfur trioxide and nitrogen oxides. The flue gas streams produced by a coal and residual oil fired electric utilities are examples of gas streams containing both solid and vaporous pollutants. Another example is the flue gas stream of the catalyst regeneration zone of a fluidized catalytic cracking process used in a petroleum refinery. This particular gas stream normally contains small pieces of the catalyst employed in the process despite having passed through one or more stages of cyclonic separation.

Cross-flow or panel filters were developed to treat particle-containing gas streams. Their use has been extended, as pointed out in the previously cited references, to the treatment of gas streams containing undesired vaporous chemical compounds. In a cross-flow filter the gas stream flows horizontally through a bed of treating particles confined between two porous walls. The openings in the walls are of sufficient size that they are not plugged by the entrained particles of the gas stream, but the openings are sized and oriented such that little or none of the treating particles flows through the openings. The entrained particles of the gas stream accumulate on the inlet surface or within the bed of treating particles in a manner resembling the more familiar collection of filtrate on the filter aids used to treat liquid streams. The buildup of particles on the outer surface of the filter bed and within the bed leads to an increased pressure drop through the bed. It is normally necessary to minimize the pressure drop through a gas treating process to make it economically practical in a large scale industrial process.

In cross-flow filters the bed of treating particles is slowly or intermittently moved to limit the buildup of collected particles and hence the pressure drop through the bed. This is preferably accomplished by the gradual downward movement of the entire filter bed on a continuous or intermittent basis. The flow of the filter bed therefore perpendicularly crosses the flow of the gas stream being treated. The moving bed is periodically replenished by new or regenerated particles added to the top of the bed. Particles at the bottom of the bed therefore have a longer accumulated residence time in the bed. When a cross-flow filter is also used to remove a chemical compound from the gas stream by a reaction between the compound and particles in the bed, the lower portion of the moving bed will have contacted a much greater amount of the gas stream, and the particles in the lowermost portion of the bed have been used to a much greater extent than the particles at the top of the bed. If the removal of the undesired chemical compound occurs by a reaction between the particles and the compounds, as in the case of copper-containing sulfur oxide "acceptors", the capacity of the particles is limited. The result is a zone of inactive particles on the inlet side of the bed, with the zone tapering from a thin layer at the top of the bed to a thick layer near the bottom of the bed.

If the rate of treating particle movement is too slow the bottom part of the zone of inactive particles will extend across the entire width of the bed of treating particles. This provides the complete utilization of the treating particles but fails to remove the undesired chemical compound from the portion of the gas stream which passes through the completely expended treating particles. On the other hand if the rate of treating particle transfer exceeds the total rate at which it is chemically expended within the bed, then potentially usable particles are being needlessly removed from the cross-flow filter. These particles are then normally subjected to several rejuvenation steps during which they are separated from accumulated fine particles, regenerated and returned to the top of the filter bed. The handling and processing of active treating particles results in an unnecessary increase in the utilities cost of operating the process, the probable waste of chemicals (acceptor reductants and/or oxidizers) and an increase in the attrition of any breakable treating particles. It is therefore an objective of the subject invention to provide a method of treating a gas stream for simultaneous particle and chemical removal using a cross-flow contactor in which the utilization of the treating particles for chemical removal is maximized. It is a further objective of the subject invention to minimize the pressure drop through a cross-flow gas treating system while maximizing utilization of the chemical treating capacity of the particles used in the system.

The subject invention is directed to, and discussed in terms of, situations in which the minimum desired rate of particle transfer downward through the contactor is governed by the concentration of the undesired chemical compounds. That is, the subject process is intended for use in instances in which the concentration of the undesired gaseous chemical compounds is great enough to require a higher rate of particle transfer than is required to treat the gas stream for particle removal at acceptable pressure drops. The subject process is therefore expected to be best suited to treating flue gas streams having relatively low particle concentrations and/or having relatively high vaporous pollutant concentrations. Flue gas streams of this type can be expected to be produced by the combustion of sulfur-containing fuel gas and residual liquid hydrocarbonaceous fuels or the combustion of high sulfur coals.

The subject process allows the maximization of the utilization of the chemical treating properties of the treating particles. The subject process may simultaneously be employed to minimize the pressure drop through the cross-flow contacting system. This is accomplished by the provision of a second bed of treating particles in a separate cross-flow contacting zone. The total gas stream is passed through the first or primary cross-flow contacting zone. All or just a portion of the thus-treated gas stream, which is referred to herein as the first process stream, is then if required passed throuqh the second cross-flow contacting zone. The function of the second contacting zone, which is also referred to herein as the second contacting bed, is to complete the chemical treatment of the gas stream. That is, the second contacting zone is intended to remove to the extent desired the remaining undesired vaporous chemical compounds present in the gas which has passed through the first contacting zone. This allows the first contacting zone to be operated with the tapered band of expended treating particles extending completely through the contacting bed. The portion of the feed gas stream passing through the bottom of the first contacting zone is therefore treated only for the removal of entrained particles and contains essentially its original concentration of the undesired chemical compounds. The desired amount of particle removal from the feed gas stream should be performed in the first contacting bed. This is to prevent plugging of the second contacting bed or any undesired particle discharge with the bypassed effluent gas.

It is preferred that the second contacting zone is located above the first contacting zone as illustrated in the drawing. The treating particles therefore preferably flow by the action of gravity downward from the second contacting zone to the first contacting zone. The remaining undesired chemical compounds which enter the second contacting zone will in the preferred embodiment reversibly consume the treating particles in the same manner as in the first contacting bed. Some of the treating particles entering the first contacting bed are expended to an extent dependent, in part, on the concentration of the undesired chemical compounds in the first process stream. The consumption of an excessive amount of treating particles in this manner in the second contacting bed can lead to operational difficulties by further reducing the active treating particles and degree of chemical treating in the first contacting bed. It is therefore desired to operate the process with only a limited degree of "slippage" of the undesired chemical compounds through the first contacting bed.

It is preferred that at least 80 mole percent of the undesired chemical compounds removed from the entering gas stream in the process are removed during the passage of the gas through the first contacting bed. It is especially preferred that at least 90 mole percent of such chemical treatment of the gas stream is performed in the first contacting bed, with the remainder being performed in the second contacting bed. To maintain the operation of the process within these preferences, it is necessary to periodically adjust the rate of treating particle transfer. This adjustment is required to compensate for changes in the flow rate and/or composition of the feed gas stream. Such feed gas variation can result from a number of factors including changes in the operating rate or operating conditions of the process generating the feed gas or changes in the composition of the fuel being consumed to generate the feed gas stream.

The degree of chemical treatment being performed in the first contacting zone is preferably determined by monitoring the composition of the first process stream, which is the effluent of the first contacting zone. In the preferred embodiment of the invention, the undesired chemical compounds include the sulfur oxides. It is therefore preferred to monitor the concentration of sulfur dioxide in the first process stream and to adjust the treating particle transfer rate based on this concentration. The adjustment procedure includes the comparison of the measured sulfur dioxide concentration against a predetermined reference, which may be based on either a desired percentage reduction in the sulfur dioxide concentration in the feed gas stream or on a maximum desired sulfur dioxide concentration in the treated gas. The sulfur dioxide concentration may be monitored directly or indirectly as by measurements of the total sulfur content of the treated gas This embodiment of the invention may be characterized as a process for treating gas streams for the simultaneous removal of entrained particles and sulfur dioxide which comprises the steps of passing a feed gas stream, which comprises undesired entrained particles and sulfur dioxide, horizontally through a vertical first contacting bed comprising a moving bed of treating particles and therein removing entrained particles from the feed gas stream by the collection of the entrained particles within the first contacting bed and also removing sulfur dioxide from the feed gas stream by the chemical reaction of the sulfur dioxide with a component of the treating particles, and thereby forming a first process stream which is substantially free of entrained particles and which has a lower concentration of sulfur dioxide than the feed gas stream; monitoring the concentration of sulfur dioxide in the first process stream; adjusting the rate of passage of the moving bed of treating particles downward through the first contacting bed in response to the previously monitored concentration of sulfur dioxide in the first process stream; passing at least a portion of the first process stream through a second contacting bed, which comprises a moving bed of treating particles; and transferring treating particles by the action of gravity from the second contacting bed to the first contacting bed.

In a related embodiment of the invention, the signal generated by monitoring the concentration of sulfur dioxide and/or other undesired chemical compounds in the first process stream is utilized to minimize the pressure drop imposed on the gas stream. A minimum pressure drop through a gas treating process is normally desirable to maximize the power recovered in depressurizing the gas stream in a turbine or to minimize the energy required to cause the gas stream to flow through the entire combustion and flue gas treating sequence. In this embodiment all or a portion of the first process stream is, to the degree acceptable, bypassed around the second contacting bed to avoid the inherent pressure drop resulting from flow through the bed. For instance, if there are active treating particles in the lowermost portion of the first contacting bed, further chemical treatment of the gas stream to further remove any gaseous chemical compounds from the first process stream should not be necessary. The entire stream may therefore be bypassed around the second contacting bed without adverse affects on the performance of the treating process.

This embodiment of the invention may be characterized as a process for treating gas streams for the simultaneous removal of sulfur oxides and entrained particles which comprises the steps of passing a feed gas stream, which comprises undesired entrained particles and sulfur dioxide, horizontally through a vertical first contacting bed comprising a moving bed of treating particles and therein removing entrained particles from the feed gas stream by the collection of entrained particles within the first contacting bed and also removing sulfur dioxide from the feed gas stream by the chemical reaction of the sulfur dioxide with a component of the treating particles, and thereby forming a first process stream which is substantially free of entrained particles and which has a lower concentration of sulfur dioxide than the feed gas stream; monitoring the concentration of sulfur dioxide in the first process stream; adjusting the relative amount of the first process stream which is passed through a second contacting bed comprising treating particles and the amount of the first process stream which is bypassed around the second contacting bed in response to the previously monitored concentration of sulfur dioxide in the first process stream; and transferring treating particles by the action of gravity from the second contacting bed to the first contacting bed.

The various embodiments are performed using two contacting zones, each of which comprises a bed of treating particles confined between two porous vertical walls. These two walls are preferably concentric cylinders but can be flat or planar partitions. The preferably concentric walls, such as shown in the drawing, provide annular contacting beds. The second contacting bed is preferably thinner or has a greater surface area or both to minimize the pressure drop through the second bed. Both walls preferably have a great number of rather large openings uniformly spaced across their surface. These openings are rather large compared to the particles entrained in the gas stream to minimize any tendency of the collected particles to plug these openings or to become tightly lodged in openings. Fine screens are therefore not preferred, but can be employed in the walls of the second contacting zone if desired since the gas entering the second contacting zone is preferably substantially free of entrained fine particles. The preferred openings in the porous walls of the first contacting bed are large enough to permit the passage of almost any of the treating particles, with this flow being prevented by the geometry of the shape of the opening rather than the size of the opening. An especially preferred type of opening is a louvered type shape formed by punching the holes in thin sheet metal. The size of the openings, measured from the edge of the louver to the wall, rather than across the width of the louver, is preferably between 0.1 and 0.5 inch (0.25 and 1.27 cm). The first contacting bed is preferably between 4 and 25 inches thick, with the second contacting bed being at least 3 inches thick. Further details on the construction of the contacting zones may be obtained by reference to U.S. Pat. Nos. 4,017,278 and 4,254,616, which list a large number of references describing the use and construction of cross-flow fluid-solid contactors.

The treating particles are preferably rounded and rather uniformly sized. The rounded surfaces promote even flow and discourage bridging of the treating particles. The average diameter of the treating particles is preferably between about 0.08 and about 0.5 inch. The diameter of the largest treating particles is preferably not more than 3 or 4 times the diameter of the smallest treating particles present in substantial quantities. A sand containing 8% U.S. sieve size No. 6, 62% U.S. sieve size No. 7 and 30% U.S. sieve size No. 8 sand is an example of treating particles highly suitable for use in the subject process for the purpose of removing entrained solids from the gas stream. To be effective in simultaneously removing sulfur oxides from the feed gas stream, all or some of the treating particles preferably contain a metal oxide which will reversibly react with the sulfur oxides to yield a metal sulfate on the surface of the treating particle. The use of vanadium oxide and cesium oxide has also been described for this purpose. The preferred metal is copper, with the treating particles containing between about 1.0 and about 15 wt. % copper. Copper is preferred as it allows the subsequent regeneration of the treating particles to be performed at temperatures close to that used in the treating step. The metal is preferably present on a refractory support having a surface area greater than 10 $m^2/g$. The preferred support is spherical alumina, with other materials such as silica, clays, bauxite, boria, etc., also being suitable if properly prepared. Further details on the manufacture of treating particles suitable for the chemical removal of sulfur oxides may be obtained by reference to U.S. Pat. Nos. 3,770,647; 3,776,854; 3,989,798; 4,001,375; 4,001,376 and 4,170,627.

The subject process may be performed at temperatures ranging from about 150° to about 450° C. but is preferably performed at a temperature of between 350° and 450° C. The pressure at which the process is performed is not critical and will normally be determined mainly by the pressure of the gas as it is delivered to the subject treating process. Relatively low pressures between atmospheric to about 500 psig are preferred for operation of the process. Sulfur oxide removal is preferably performed in an oxidative atmosphere containing free oxygen. The cross-flow velocity of the gas stream is limited by both pressure drop considerations and a desire to prevent the gas flow from carrying any significant quantities of treating particles out of the contacting beds. The superficial velocity of the gas stream through the contacting bed is preferably between about 0.4 and about 3.5 ft/sec. The pressure drop through the first contacting zone is preferably less than about 12 inches of water. The rate of treating particle transfer is governed by the previously described factors unless it is necessary to temporarily increase the rate of transfer to reduce the pressure drop caused by unusually high accumulations of collected solids within the contacting zone. The first contacting zone is preferably operated and designed to provide a downward treating particle velocity between about 0.5 and 40 feet per hour.

The treating particles removed from the bottom of the first contacting bed are preferably first separated from the fine particles collected from the feed gas stream, as by elutriation, and then regenerated. Regeneration of the preferred chemical treating particles can be achieved by contact with reducing gas, such as hydrogen or methane, at elevated temperatures similar to the treating conditions. This yields a concentrated stream of released sulfur oxides which is separately withdrawn for collection and processing. The regenerated treating particles may then be returned directly to the top of the second contacting bed. Further details on the regeneration of the preferred treating particles may be obtained from the previously cited references and from U.S. Pat. Nos. 3,832,445 and 3,892,677.

The reduction of nitrogen oxides to nitrogen is catalyzed by copper sulfate on alumina. It may therefore be performed simultaneously with the removal of sulfur oxides from flue gas streams by copper-containing treating particles to prevent the escape into the atmosphere of both of these chemical pollutants. In this process embodiment, a reductant is admixed with the feed gas stream prior to the contacting of the feed gas stream with the first contacting bed. The preferred reductant is ammonia but other gaseous compounds including various light hydrocarbons such as methane may also be employed. An excess of reductant is avoided to prevent the presence of this possible pollutant in the treated gas. The temperature, pressure and flow rate conditions suitable for the reduction of nitrogen oxides using the preferred treating particles are generally very similar to those preferred for the removal of sulfur oxides, with the contacting temperature preferably being between about 350° and about 450° C.

I claim as my invention:

1. A process for treating gas streams for the simultaneous removal of sulfur dioxide nitrogen oxides and entrained particles which comprises the steps of:
    (a) passing a feed gas stream and a reductant, which comprises undesired entrained particles, nitrogen oxides, and sulfur dioxide, horizontally through a vertical first contacting bed comprising a moving bed of treating particles and therein removing entrained particles comprising copper or copper containing compounds from the feed gas stream by the collection of entrained particles within the first contacting bed and also removing sulfur dioxide and nitrogen oxides from the feed gas stream by the chemical reaction of the sulfur dioxide with a component of copper or copper containing treating particles and the reduction of the nitrogen oxides within the first contacting bed, and thereby forming a first process stream which is substantially free of entrained particles and which has a lower concentration of sulfur dioxide and nitrogen oxides than the feed gas stream;
    (b) monitoring the concentration of sulfur dioxide in the first process stream;
    (c) adjusting the amount of the first process stream which is passed through a second contacting bed comprising treating particles comprising copper or copper containing compounds and the amount of the first process stream which is bypassed around the second contacting bed in response to the previously monitored concentration of sulfur dioxide in the first process stream; and,
    (d) transferring the treating particles comprising copper or copper containing compounds by the action of gravity from the second contacting bed to the first contacting bed.

2. The process of claim 1 further characterized in that the feed gas stream is a flue gas stream of a fluidized catalytic cracking unit.

3. A process for treating gas streams for the simultaneous removal of entrained particles, nitrogen oxides, and sulfur dioxide which comprises the steps of:
    (a) passing a reductant and a feed gas stream, which comprises undesired entrained particles, nitrogen oxides and sulfur dioxide, horizontally through a vertical first contacting bed comprising a moving bed of treating particles comprising copper or copper containing compounds and therein removing entrained particles from the feed gas stream by the collection of the entrained particles within the first contacting bed removing sulfur dioxide from the feed gas stream by the chemical reaction of the sulfur dioxide with a component of the copper or copper containing treating particles and the reduction of the nitrogen oxides within the first contacting bed, and thereby forming a first process stream which is substantially free of entrained particles and which has a lower concentration of sulfur dioxide and nitrogen oxides than the feed gas stream;
    (b) monitoring the concentration of sulfur dioxide in the first process stream;
    (c) adjusting the rate of passage of the moving bed of treating particles downward through the first contacting bed in response to the previously monitored concentration of sulfur dioxide in the first process stream;
    (d) passing at least a portion of the first process stream through a second contacting bed, which comprises a moving bed of treating particles comprising copper or a copper containing compounds; and,
    (e) transferring the treating particles comprising copper or a copper containing compounds by the action of gravity from the second contacting bed to the first contacting bed.

4. The process of claim 3 further characterized in that the feed gas stream is derived from the combustion of a solid carbonaceous material.

5. The process of claim 3 further characterized in that the feed gas stream is a flue gas stream of a fluidized catalytic cracking unit.

* * * * *